United States Patent
Kawaguchi et al.

(10) Patent No.: US 6,220,606 B1
(45) Date of Patent: *Apr. 24, 2001

(54) METALLIC GASKET

(75) Inventors: Shigeru Kawaguchi; Kenji Kubouchi; Tadaumi Matsumoto, all of Osaka; Jin Hashioka; Takeshi Kitamura, both of Aichi-ken, all of (JP)

(73) Assignees: Nippon Gasket Co., Ltd.; Toyota Jidousha Kabushiki Kaisha, both of Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 07/798,339

(22) Filed: Nov. 26, 1991

(51) Int. Cl.$^7$ ...................................... F02F 11/00
(52) U.S. Cl. ........................ 277/595; 277/593; 277/594
(58) Field of Search .................. 277/235 B, 236, 277/237, 235 R, 180, 593, 594, 596

(56) References Cited

U.S. PATENT DOCUMENTS

| | | | | |
|---|---|---|---|---|
| 3,430,611 | * | 3/1969 | Belter | 277/235 B |
| 3,738,558 | * | 6/1973 | Colwell | 277/235 B |
| 3,841,289 | * | 10/1974 | Meyers | 277/235 B |
| 4,213,620 | * | 7/1980 | Kennedy et al. | 277/235 B |
| 4,335,890 | * | 6/1982 | Nicholson | 277/235 B |
| 4,397,472 | * | 8/1983 | Czernik | 277/235 B |
| 4,728,110 | * | 3/1988 | Nakasone | 277/235 B |
| 4,836,562 | * | 6/1989 | Yoshino | 277/235 B |

FOREIGN PATENT DOCUMENTS

| | | | |
|---|---|---|---|
| 62-181756 | | 11/1987 | (JP) . |
| 6359262 | | 4/1988 | (JP) . |
| 6362668 | | 4/1988 | (JP) . |
| 6374561 | | 5/1988 | (JP) . |
| 6374562 | | 5/1988 | (JP) . |
| 0186950 | * | 8/1988 | (JP) ................................. 277/235 B |
| 63-246571 | | 10/1988 | (JP) . |
| 63-293363 | | 11/1988 | (JP) . |
| 643059 | | 1/1989 | (JP) . |
| 135057 | | 2/1989 | (JP) . |
| 165367 | | 3/1989 | (JP) . |
| 173157 | | 3/1989 | (JP) . |
| 6465367 | | 3/1989 | (JP) . |
| 1104953 | | 4/1989 | (JP) . |
| 0104953 | * | 4/1989 | (JP) ................................. 277/235 B |

* cited by examiner

*Primary Examiner*—Daniel G. DePumpo
(74) *Attorney, Agent, or Firm*—James A. Wong

(57) ABSTRACT

A laminate-type metallic gasket comprising adjacent combustion chamber holes (A, A), a pair of bead substrates (3, 4) made of an elastic metallic plate with a bead (1) formed along each of the combustion chamber holes (A, A) and first and second intermediate plates (6, 8), in which peak portions of beads (1) are symmetrically opposite to each other, disposed between the two bead substrates (3, 4) according to the present invention wherein a first intermediate plate (6) is provided with a step (9) having a thickness less than that of a second intermediate (8) formed along an edge portion (7) of the combustion chamber holes (A, A). The intermediate plate (8) is disposed upon an outer surface which is made of a downwardly convex surface (10) by a formation of the step (9), and an edge portion (11) of the second intermediate plate (8) being folded back between the second intermediate plate (8) and the edge portion (7) of the combustion chamber holes (A, A) of the first intermediate plate (6) to form the compensating portion (12) having a thickness larger than the total thickness of the two intermediate plates (6, 8) at a portion, where peak portions of the beads (1) are respectively brought into contact with the first and second intermediate plates (6, 8), around the combustion chamber holes (A, A).

4 Claims, 1 Drawing Sheet

METALLIC GASKET

BACKGROUND OF THE INVENTION

1. Field of the Invention

The present invention relates to a metallic gasket to be disposed between a cylinder head and a cylinder block for sealing adjoining surfaces of the cylinder head and the cylinder block of a Diesel engine, for example. More particularly, this invention relates to a metallic gasket comprising two bead substrates made of an elastic metallic plate with a bead portion formed in an outlined shape along a circumferential edge of a combustion chamber hole and an intermediate metallic plate disposed between the two bead substrates.

2. Prior Art

As to a metallic gasket of this kind, a metallic gasket comprising two bead substrates made of an elastic metallic plate with a bead formed along a circumferential edge of a combustion chamber hole, two intermediate plates disposed between the two bead substrates and a compensating member provided with a spacer member carried between the two intermediate plates at a position of the combustion chamber hole rather than a position where the beads are engaged with each other to compensate for an irregularity in a gap between deck surfaces is disclosed in Japanese Patent Application Laid-Open No. Sho 63-293363. Moreover, a metallic gasket comprising two bead substrates made of an elastic metallic plate with a bead formed along a circumferential edge of a combustion chamber hole and two intermediate plates disposed between the two bead substrate, an edge portion of one intermediate plate being held with an edge portion of the other intermediate plate in the form of a grommet to form a compensating bent portion for forming an almost identical step on both surfaces is disclosed in Japanese Patent Application Laid-Open No. Sho 64-65367.

In the metallic gasket disclosed in Japanese Patent Application Laid-Open No. Sho 63-293363, since the spacer member is carried between two intermediate plates at the position of the combustion chamber hole rather than the position where the beads are opposite to each other, an adjoining surface is increased by one to lower a sealing capacity and the sealing member must be fixed by means of welding, adhesion and the like and thus not only is the cost of processing increased, but also it is difficult to provide an accurate thickness to the compensating member and also this becomes one reason of the lowered sealing capacity.

In addition, in the metallic gasket disclosed in Japanese Patent Application Laid-Open No. Sho 64-65367, the edge portion of one intermediate plate is held with the edge portion of the other intermediate plate in the form of a grommet to form the compensating bent portion for forming the almost identical step on both surfaces; but if the compensating bent portion is disposed between the bead substrates on both sides to be fully compressed between a cylinder head and a cylinder block, the bent stepped portion held in the form of a grommet acts as a shim for the beads and thus an amplitude of a stress to the bead substrates is reduced but a bending stress and an amplitude of the bending stress are generated in the bent portion. Consequently, problems have occurred in that cracks and collapses are generated in the bent portion and thus cracks and collapses are brought about also in the bead plates.

SUMMARY OF THE INVENTION

It is an object of the present invention to provide a superior metallic gasket capable of preventing a full-compression of beads of two bead substrates, forming a compensating portion on a circumferential edge of a combustion chamber hole and optionally setting a thickness of the compensating portion to achieve a well-balanced surface pressure.

It is also an object of the present invention to provide a superior metallic gasket capable of reducing a fluctuation of a stress of the bead substrates and a bending stress acting upon the compensating portion to prevent bead portions and the compensating portions from being broken and a sealing effect from being reduced to exhibit a stable sealing effect.

A laminate-type metallic gasket comprising neighboring or adjacent combustion chamber holes A, two bead substrates 3, 4 each made of an elastic metallic plate with a bead 1 formed along the combustion chamber holes A and two intermediate plates 6, 8, disposed between the two bead substrates 3, 4 and with which peak portions of beads 1 are symmetrically brought into contact according to the present invention wherein the first intermediate plate 6 is provided with a step 9 having a thickness less than that of the second intermediate plate 8 formed along an edge portion 7 of the combustion chamber holes, the intermediate plate 8 being disposed upon an outer surface which is made downwardly convex 10 by a formation of step 9, and an edge portion 11 of the second intermediate plate 8 being folded back between the second intermediate plate 8 and the edge portion 7 of the combustion chamber holes to form compensating portions 12 having a thickness larger than that of the total thickness of the two intermediate plate 6, 8 in a portion where summit portions of the bead 1 are respectively brought into contact with the first and second intermediate plates 6, 8 on a circumference of the combustion chamber holes.

DETAILED DESCRIPTION OF THE INVENTION

A construction of a metallic gasket according to the present invention will be described below with reference to the preferred embodiments.

Figure 1:
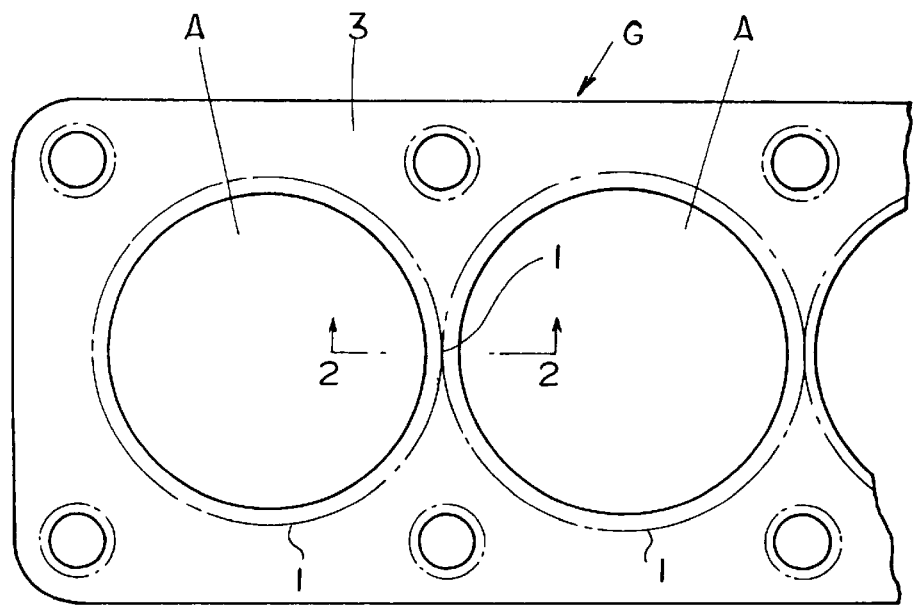
FIG. 1 is a partially omitted partial plan view showing a metallic gasket according to the present invention.
Figure 2:
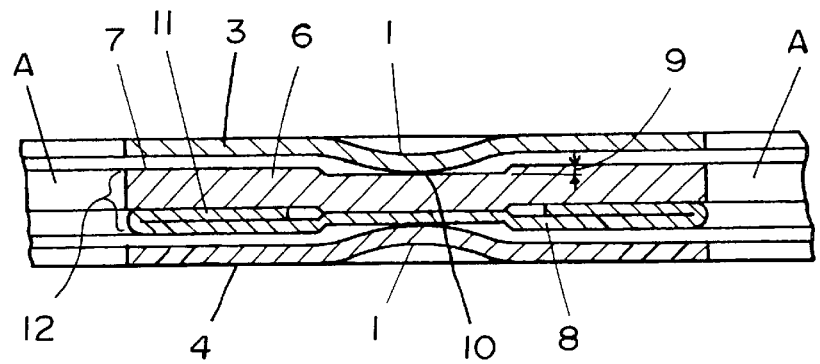
FIG. 2 is an enlarged sectional view of FIG. 1 taken along a line 2—2 thereof showing a first preferred embodiment.
Figure 3:
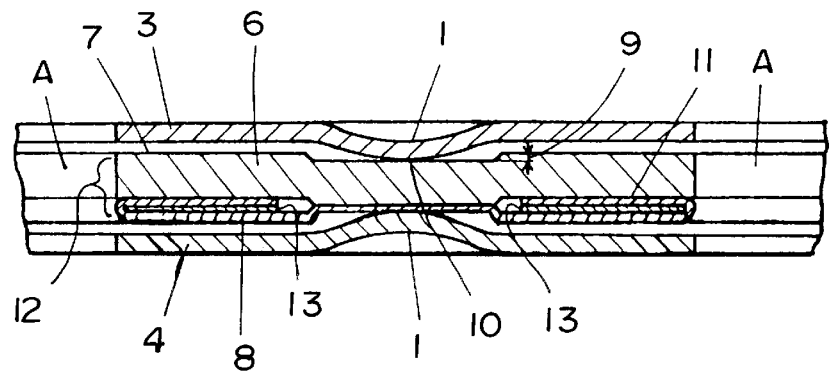
FIG. 3 is an enlarged sectional view of FIG. 1 taken along a line 2—2 thereof showing a second preferred embodiment.

FIG. 1 is a partially omitted partial plan view showing a metallic gasket according to the present invention, FIG. 2 being an enlarged sectional view of FIG. 1 taken along a line 2—2 thereof showing the first preferred embodiment, and FIG. 3 being an enlarged section view of FIG. 1 taken along a line 2—2 thereof showing the second preferred embodiment.

Both the metallic gasket shown in FIG. 2 as the first preferred embodiment and the metallic gasket shown in FIG. 3 as the second preferred embodiment are based on a laminate-type metallic gasket comprising neighboring or adjacent combustion chamber holes A, two bead plates 3, 4 made of an elastic metallic plate with a bead 1 formed along combustion chamber holes A and an intermediate plate disposed between the bead substrates 3, 4.

In the above-described basic metallic gasket according to the first preferred embodiment, a thin second intermediate plate 8 having a Vickers Hardness Number Hv of 130 to 200 and a thickness of 0.2 mm and a first intermediate plate 6 having an Hv of 90 to 120 and a thickness of 0.6 mm are used, a step 9 having a height of 0.1 mm being formed along a combustion chamber hole edge portion 7 of the first intermediate plate 6, the second intermediate plate 8 being put on an outer surface of the first intermediate plate 6 which is made downwardly convex 10 by forming the step 9, and each edge portion 11 of the second intermediate plate 8 being folded back between the second intermediate plate 8 and edge portion 7 of the combustion chamber holes A of the first intermediate plate 6 to form together with the first intermediate plate 6 a compensating portion 12 around the combustion chamber holes A, whereby forming a concaved portion having a depth of 0.1 mm at positions where the beads 1 of the bead substrates 3, 4 are respectively brought into contact with the first and second intermediate plates 6, 8 to form together with the first intermediate plate 6 the compensating portion 12 having a thickness of 1.0 mm around the combustion chamber holes A.

In addition, a folding back width of the second intermediate plate 8 can be widened between the combustion chamber holes A and narrowed at other portions and the step 9 can be optionally changed by a preliminary pushing process by giving the second intermediate plate 8 an increased hardness, whereby a surface pressure can be regulated.

The metallic gasket according to the second preferred embodiment has a construction that the second intermediate plate 8 has a thickness of 0.1 mm, a soft member 13 made of soft metals, graphite sheets, resins and the like having a thickness of 0.1 mm is provided within an inside folded back portion of the edge portion 11, and the first intermediate plate 6 having a thickness of 0.7 mm is provided with the step 9 having a height of 0.1 mm and disposed upon the second intermediate plate 8.

In the metallic gaskets according to the first and second preferred embodiments of the present invention having the above described constructions, they are arranged between the cylinder block and the cylinder head to be compressably fixed by means of a clamping bolt and the like, whereby the beads 1 of the bead substrates 3, 4 on both sides are gradually reduced in height by a tightening force of the clamping bolt but a pressing force is hindered by the thickness of the compensating portion 12 to prevent the fully compressed condition of the beads 1 and thus the superior sealing property can be secured, the amplitude of the stress of the bead substrate 4 being reduced by the formation of the compensating portion 12, no increased bending stress and amplitude of the stress being generated in the compensating portion 12, and thus no crack and collapse being brought about in the bead substrates 3, 4.

In addition, if the soft member 13 and the like are provided within the inside folded back portion of the edge portion 11 of the second intermediate plate 8 as in the second preferred embodiment, the soft member 13 can be fixed without using any special fixing means, so that an advantage occurs in processing and the folded-back portion is improved in accuracy and thus a compensating capacity can be still more secured.

According to the present invention, in a laminate-type metallic gasket comprising adjacent combustion chamber holes A, two bead substrate 3, 4 made of an elastic metallic plate with a bead 1 formed along the combustion chamber holes A and two intermediate plates, in which peak portions of bead 1 are symmetrically opposite to each other, disposed between the two bead substrates 3, 4, the first intermediate plate 6 is provided with the step 9 having a thickness less than that of the second intermediate plate 8 formed along the edge portion 7 of the combustion chamber holes, the intermediate plate 8 being put upon an outer surface which is made downwardly convex 10 by a formation of step 9, and the edge portion 11 of the second intermediate plate 8 being folded back between the second intermediate plate 8 and edge portion 7 of the combustion chamber holes of the first intermediate plate 6 to form the compensating portions 12 having a thickness larger than the total thickness of the two intermediate plates at a portion, where peak portions of the beads 1 are respectively brought into contact with the first and second intermedaiate plates 6, 8 around the combustion chamber holes A, so that the concaved portions are formed on both surfaces at the position where the beads 1 of the bead substrates 3, 4 are respectively brought into contact with the first and second intermediate plates 6, 8, to form the highly accurate compensating portion 12 having a thickness larger than that of the concaved portions around the combustion chamber holes A.

Thus, the beads 1 of the bead substrates 3, 4 on both sides are gradually reduced in height by the tightening force of the clamping bolt while the pressing force is hindered by the thickness of the compensating portion 12 to prevent the fully compressed condition of the beads 1 and thus the stabilized sealing effect can be obtained, the amplitude of the stress of the bead substrate 4 being reduced by the formation of the compensating portion 12, no increased bending stress and amplitude of the stress being generated in the compensating portion 12, and thus the metallic gasket superior in durability, in which no crack and collapse is brought about in the bead substrates 3, 4, can be provided.

In addition, edge portion 11 of the second intermediate plate 8 is folded back between the second intermediate plate 8 and the edge portion 7 of the combustion chamber holes A of the first intermediate plate 6 to form the compensating portion 12, so that the contact surface is reduced as compared with the conventional one and thus an advantage occurs in sealing property. Furthermore, the highly accurate compensating portion can be formed without using the conventional grommet, the spacer member requiring the troublesome fixation and the like, so that the metallic gasket easy in production, reduced in number of parts and thus inexpensive in material cost and superior in sealing property can be provided.

What is claimed is:

1. A laminate-type metallic gasket comprising adjacent combustion chamber holes (A, A), a pair of beads (3, 4) each made of an elastic metallic plate with a bead (1) formed along each of said combustion chamber holes (A, A), and first and second (6, 8) intermediate plates disposed between said beads (3, 4,) with which peak portions of said beads (1) are respectively in symmetrical contact, one of said plates (6) having steps (9) formed along peripheral edge portions (7) on the combustion chamber holes (A, A) and the other of said plates (8) having a thickness less than that of said one plate (6), said other plate (8) being disposed upon an outer surface of a convex (10) defined by the steps (9), and edge portions (11) of said other plate (8) being folded back into and between said other plate (8) and said edge portion (7) of said one plate (6) to form together with said one plate (6) a compensating portion (12) having a thickness larger than the total thickness of said plates (6, 8) at a portion where the peak portions of the beads (1) are respectively in contact with said one plate (6) and said other plate (8).

2. A metallic gasket as set forth in claim 1, wherein said step (9) has a thickness not more than that of said other plate (8) and a soft member (13) is disposed within a folded back portion of said other (8) to form said compensating portion (12).

3. A metallic gasket as set forth in claim 1, wherein said one plate (6) is made of a soft metallic material and said other plate (8) is made of a hard metallic material.

4. A metallic gasket as set forth in claim 1, wherein said one plate (6) is of greater thickness than said other plate (8).

\* \* \* \* \*